(12) United States Patent
Cuddihy et al.

(10) Patent No.: US 6,206,415 B1
(45) Date of Patent: *Mar. 27, 2001

(54) VEHICLE AIRBAG DEACTIVATION SYSTEM

(75) Inventors: Mark Anthony Cuddihy, New Boston; J B Drummond, Southfield; Matt Alan Niesluchowski, Troy; Richard Michael Ross, Grosse Ile; Paul Simmons, Chesterfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/993,958

(22) Filed: Dec. 18, 1997

(51) Int. Cl.$^7$ ..................................... B60R 21/32
(52) U.S. Cl. ......................... 280/735; 180/282; 307/10.1
(58) Field of Search ........................... 280/735; 180/282; 307/10.1; 70/278.1, 278.2; 250/227.1

(56) References Cited

U.S. PATENT DOCUMENTS

| | | |
|---|---|---|
| 3,672,699 | 6/1972 | De Windt . |
| 5,161,820 | 11/1992 | Vollmer . |
| 5,165,717 | 11/1992 | Tanaka . |
| 5,324,074 | 6/1994 | Christian et al. . |
| 5,474,327 | 12/1995 | Schousek . |
| 5,528,698 | 6/1996 | Kamei et al. . |
| 5,544,914 | 8/1996 | Borninski et al. . |
| 5,641,952 | 6/1997 | Collings . |
| 5,653,462 | 8/1997 | Breed et al. . |
| 5,816,611 | * 10/1998 | Parn ..................................... 280/734 |
| 5,866,954 | * 2/1999 | Daniel et al. ....................... 307/10.1 |
| 5,938,234 | * 8/1999 | Cuddihy et al. ..................... 280/735 |

* cited by examiner

Primary Examiner—Brian L. Johnson
Assistant Examiner—Faye M. Fleming
(74) Attorney, Agent, or Firm—David B. Kelley (57) ABSTRACT

An airbag deactivation system for the airbags mounted in a motor vehicle. The system provides a switch and circuitry to allow for selective deactivation of driver and/or passenger airbags in a motor vehicle via a conventional ignition key inserted into a key cylinder. The switch includes interchangeable key cylinders to allow for limited selective deactivation and a key stop to limit the amount of insertion of the ignition key into the key cylinder. LED's emit light from the deactivation module when indicating a deactivation condition, which is viewable by both a driver and a front seat passenger. Alternatively, LED's are mounted in a remote indicator assembly, separate from the deactivation module, to provide improved visual indication to the driver and front seat passenger of the state of airbag deactivation.

11 Claims, 9 Drawing Sheets

VEHICLE AIRBAG DEACTIVATION SYSTEM

FIELD OF THE INVENTION

The present invention relates to automotive vehicle occupant restraint systems, particularly airbags. It relates more specifically to mechanisms for selectively disabling part or all of those systems.

BACKGROUND OF THE INVENTION

Since inflatable occupant restraint systems or airbag systems have come into widespread use in the automotive industry, it has been observed that there are certain instances in which it may be desirable to deactivate the airbag system, or a portion thereof, in a vehicle during the period in which the vehicle is in use. Exemplary of such instances is that present when a vehicle has airbags for both the driver and front passenger positions and a rear facing infant seat is placed in the front passenger position, not properly positioned for use with the airbag. Another example is that of a driver who is small in stature and must operate the vehicle from a seating position that is very close to the steering wheel of the vehicle.

Since practically all airbag systems presently in use are activated by transmitting an electrical signal powered by the vehicle electrical system, it has been suggested to provide switching to effect deactivation of the airbag system, or a portion thereof, on a selective basis. U.S. Pat. Nos. 5,324,074; 5,234,228; 5,161,820; and 5,544,914 are exemplary of such approaches.

Certain disadvantages, however, are noted in the prior art disabling systems. These disadvantages arise from the appropriate desire of the designer of the occupant restraint system to ensure that because of the inherent normal benefit of having the airbag system operating, the disabling takes place only when intended and only under control of the operator of the motor vehicle. It is also desired that the reliability and efficacy of this disabling device be monitored during a vehicle operating event which might normally give rise to operation of the airbag deactivated by the deactivation system. Further, it is desirable that one have the flexibility to selectively disable only the desired airbag(s) in a multi-airbag system.

Further, in order to minimize the cost to vehicle owners, preferably any airbag deactivation system will be easy and quick to install, generally using existing airbag system connections that are in place on a large variety of airbag equipped vehicles; and will be easily adaptable to various vehicles with common parts to further minimize the cost. Also, preferably, any changes to the existing airbag system will not detract from the current overall safety of the vehicle due to the new deactivation equipment.

SUMMARY OF THE INVENTION

In its embodiments, the present invention contemplates an airbag restraint system for use in a vehicle. The airbag restraint system includes a first airbag assembly adapted to be mounted within the vehicle, and a second airbag assembly adapted to be mounted within the vehicle. An airbag control circuit operatively engages the first and the second airbag assemblies, and includes a wiring harness, a diagnostics module having connector adapted for receiving the wiring harness, and a deactivation module having a connector interchangeable with the connector for the diagnostic module connected to the wiring harness and wiring extending to the diagnostic module connector. The airbag restraint system also includes an airbag deactivation circuit, operatively engaging the deactivation module, including switch means for selectively deactivating the first airbag assembly, the second airbag assembly, and both airbag assemblies. The present invention further contemplates an airbag restraint system for use in a vehicle. The airbag restraint system includes a first airbag assembly adapted to be mounted within the vehicle, a second airbag assembly adapted to be mounted within the vehicle, and an airbag control circuit operatively engaging the first and the second airbag assemblies. An airbag deactivation circuit operatively engages the airbag control circuit and includes a switch having multiple positions whereby one or more airbag assemblies can be selectively deactivated. Also, a remote indicator assembly, spaced from and operatively engaging the airbag deactivation circuit, has means for indicating the switch positions where one or more airbag assemblies are deactivated.

Accordingly, an object of the present invention is to provide an airbag deactivation system that will selectively deactivate one or more airbags in a vehicle, when desired.

Another object of the present invention is to provide an airbag deactivation assembly that is easily adapted to install in a large variety of vehicles equipped with multiple airbags and will indicate the particular airbags deactivated.

A further object of the present invention is to provide an airbag deactivation system that can be selectively configured to allow for deactivation of only certain airbags within a particular vehicle, but does not require a change in the circuitry and connections of the system.

An advantage of the present invention is that the airbag deactivation system is configurable to provide an optimal viewing location of deactivation indicators for both driver and front seat passengers.

Another advantage of the present invention is that the deactivation system is switchable with generally any typical ignition key for a light vehicle, but not generally by children or inadvertently.

An additional advantage of the present invention is that the airbag deactivation module will maintain a record of the current switch setting during an airbag actuation event.

A further advantage of the present invention is that a vehicle airbag system can still perform a diagnostic check even when one or more airbags are deactivated.

DETAILED DESCRIPTION OF THE PREFERRED EMBODIMENTS

Figure 1:
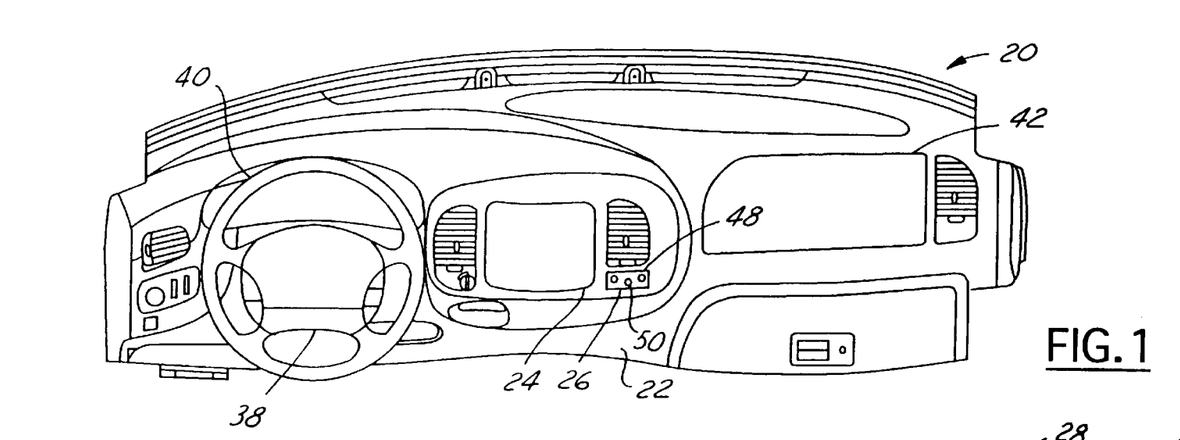
FIG. 1 is an elevation view of an automotive instrument panel illustrating installation of an airbag deactivation system according to the present invention.
Figure 2:
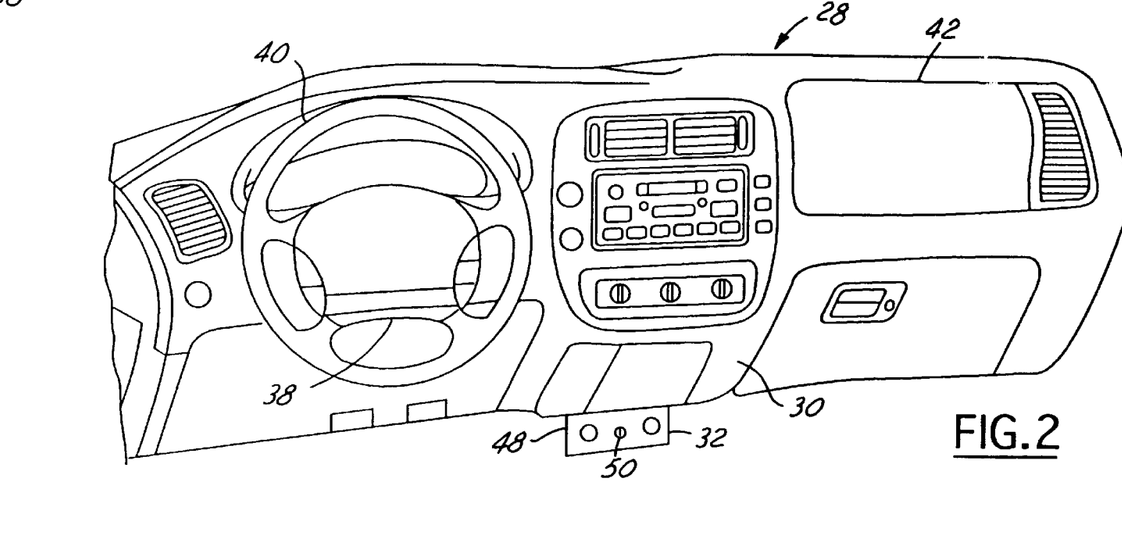
FIG. 2 is a view similar to FIG. 1 illustrating an alternate embodiment for installation of the airbag deactivation system.

FIG. 1 illustrates an instrument panel 20 of an automotive vehicle including a main body portion 22 having a center section 24 in which is mounted an airbag deactivation system 26 according to the present invention. FIG. 2 differs slightly from FIG. 1. The embodiments of FIGS. 1 and 2 differ in that the instrument panel 20 of the FIG. 1 embodiment includes the airbag deactivation system module 26 mounted directly into the main body portion 22. On the other hand, the FIG. 2 embodiment illustrates an instrument panel 28 having a main body portion 30 and an airbag deactivation system module 32 positioned to suspend below the main body portion 30. Hereinafter, since the difference between the FIG. 1 embodiment and FIG. 2 embodiment is just the mounting location of the airbag deactivation system modules 26,32, when referring to the components in the FIG. 1 embodiment, the FIG. 2 embodiment will not be specifically referenced, although the discussion will also apply. In either case, the location of any indicators for the airbag deactivation are preferably such that they are viewable by both the driver and any front seat passenger.

It is contemplated the that deactivation system module 26 is best utilized in automotive vehicles that have airbag assemblies installed in at least two seating positions in the front seat of a vehicle; an airbag assembly 38 in a steering wheel 40 protruding from the instrument panel 20, and an airbag assembly 42 generally in front of the passenger position(s) in the front seat of a vehicle. When the front passenger seat the passenger airbag assembly 42 is unoccupied or is occupied by persons or things for which operation of the airbag system is not desired, then it is advantageous to deactivate this airbag assembly 42.

Some exemplary uses are the deactivation of the passenger airbag assembly 42 in situations in which an infant in a rear facing child seat is placed in the front passenger position, or when a small child is placed in this seating position. It may be desirable, then, to deactivate the passenger airbag assembly 42. Another example is a situation where a person of very small stature is operating the vehicle, and will be in such a position that this person must operate the vehicle while in very close proximity to the driver airbag assembly 38. In this situation, it may be desirable to deactivate the driver side airbag assembly 38. A combination of the above examples, or other conditions, may also warrant a desire to selectively deactivate both the passenger 42 and driver 38 airbag assemblies.

Figure 3A:
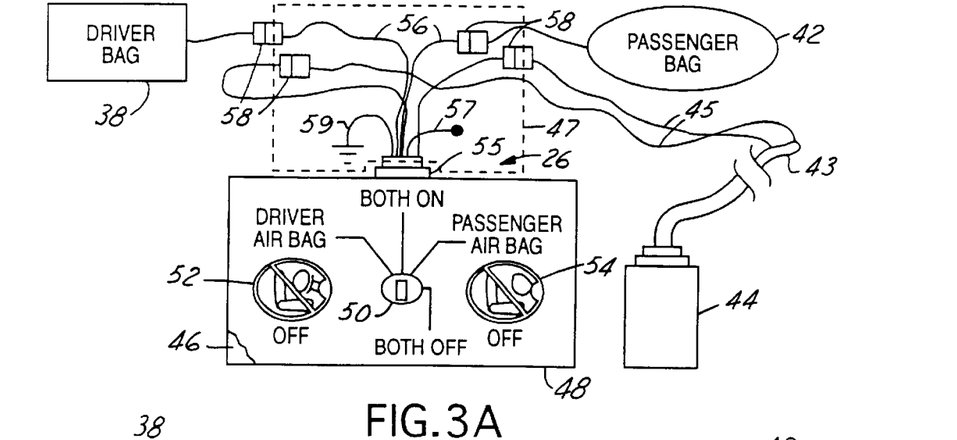
FIG. 3A is a partially schematic view of an airbag disabling system as applicable to FIGS. 1 and 2 in accordance with the present invention.

The configuration of the airbag deactivation module 26 and airbag assemblies 38,42 for that illustrated in FIG. 1 can best be seen in FIG. 3A. An airbag diagnostic module 44 is connected to a wiring harness 43 and includes electrical wires 45 extending therefrom in the direction of the airbag assemblies 38,42. This arrangement is typical of an airbag system whether or not is has a deactivation mechanism. The airbag deactivation module 26 includes a housing 46, which mounts to the instrument panel 20, with a bezel 48 mounted to the front of the housing 46. The bezel 48 includes an opening, through which a key cylinder 50 protrudes, and two indicator lights 52,54, one on either side of the key cylinder 50. Within the housing 46 is an interface connector module 55 which receives the wires 45 from the diagnostic module 44 and includes electrical wires 56 extending therefrom to the airbag assemblies 38,42. Also, power 57, from the ignition, and a ground 59 connect through the module 55.

For this embodiment, the wires are illustrated with splices 58 in them. This configuration illustrates a deactivation system 26 which is added to a vehicle after production. This configuration allows for the addition of the deactivation system 26 with minimal splicing of wires and no need to splice into a large wire harness. The location of the splices 58 (connectors) will help to minimize the work required to install the system. If the deactivation system 26 is designed into the particular vehicle prior to production, then the splices of course would not be needed. The wires extending between the connector module 55 and splices 58, then, form an overlay harness 47, which allows for adjustment to different vehicle specific wiring configurations. This allows for the one switch to be adapted to many vehicles.

Figure 3B:
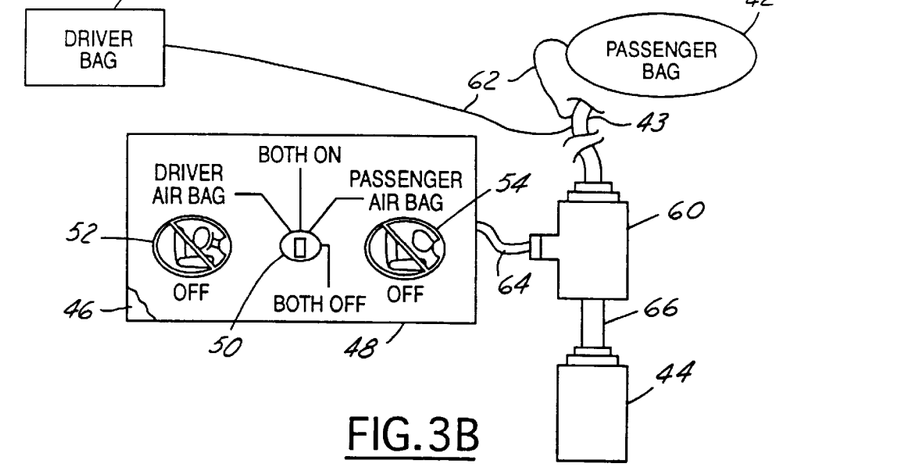
FIG. 3B is a partially schematic view, similar to FIG. 3A, of an alternate embodiment of an airbag disabling system.

FIG. 3B illustrates an alternate embodiment of the airbag deactivation module 26 of FIG. 3A in that the interface connection module 60 is now located outside of the housing 46. It connects directly to the wiring harness 43 in the same way as the airbag diagnostic module 44 in FIG. 3A and in the same way as do vehicles without any deactivation circuitry. The interface connection module 60 includes wiring 64 extending to the housing 46 and wiring 66 extending to the airbag diagnostic module 44. The other wires 62 now extend from the wire harness 43 to the airbag assemblies 38,42 without any splices. For this embodiment, a vehicle with an existing airbag system can be retrofitted with the deactivation capability without having to splice into the wiring harness connected to the airbag system or to the wiring connecting to the airbags 38,42 themselves, thus minimizing the installation effort. The only part, then, that needs to adapt for different vehicles is the interface connection module 60, with the other components generally being common to various systems.

Figure 4:
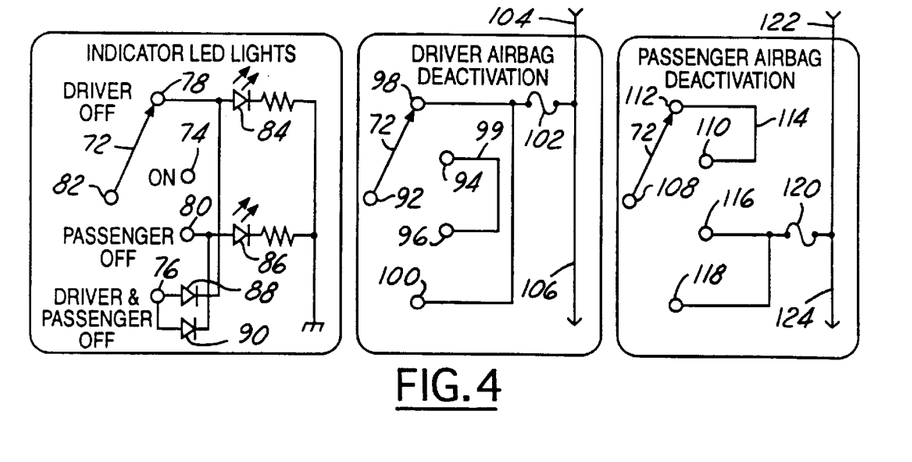
FIG. 4 is an electrical schematic of a deactivation switching circuit employed in the system illustrated in FIGS. 3A and 3B in accordance with the present invention.

FIG. 4 illustrates the electronics behind the deactivation switch, which is mechanically operated by the key cylinder 50. The three boxes illustrated in FIG. 4 indicate parallel circuitry on the same switch, with the leftmost box indicating the circuitry for controlling light-emitting diode (LED) indicators, the middle box indicating the circuitry for the driver airbag deactivation settings and the right box indicating the circuitry for the passenger airbag deactivation settings. The switch 72 is a four position, three pole switch actuated by rotation of the key cylinder 50, shown in FIGS. 3A and 3B.

Viewing the leftmost box in FIG. 4, a first switch position 74 corresponds to a driver and passenger airbags on condition, while a second switch position 78 corresponds to a driver off (deactivated) and a passenger airbag on condition. A third switch position 80 corresponds to a driver on and a passenger off (deactivated) airbag condition, while a fourth switch position 76 corresponds to a driver and passenger airbags off (deactivated) condition.

The base 82 of the switch 72 is connected to a source of power that is activated when the vehicle ignition is on. For the first switch position 74, the power connects to none of the LED's, so no light will be emitted from the airbag deactivation module 26 (illustrated in FIGS. 1–3B). When the switch 72 is in the second switch position 78, a driver-off LED 84 will be activated. This LED 84 is positioned, as seen in FIG. 3A, behind the indicator light opening 52, to indicate to the vehicle operator that the driver side airbag assembly is deactivated. When the switch 72 is in the third switch position 80, a passenger-off LED 86 will be activated. This LED 86 is positioned, as seen in FIG. 3A, behind the indicator light opening 54, to indicate to the vehicle operator that the passenger side airbag assembly is deactivated. Diodes 88 and 90 isolate the driver and passenger airbag circuits.

At the same time that the movement of the switch 72 effects changes in the activation of the LED's, it also effects deactivations of the airbag assemblies. The middle box in FIG. 4 illustrates the driver airbag assembly deactivation circuit. The base 92 of the switch 72 connects to a return line, for the driver airbag assembly, to the airbag diagnostic module. When the switch 72 is placed in a first switch position 94 or a third switch position 96, the switch 72 connects to a return line 99 from the airbag system for the driver airbag assembly. In these positions, the driver airbag assembly is active.

When the switch 72 is placed in an second switch position 98 or a fourth switch position 100, the return line to the airbag diagnostic module is now connected, through a combined resistor-fuse 102, between a feed line 104 from the airbag system and a feed line 106 to the airbag diagnostics module for the driver airbag assembly. The driver airbag assembly is now deactivated, but the resistor-fuse 102 is connected to the system to allow for current flow during diagnostic checks on the driver airbag system.

The right box in FIG. 4 illustrates the passenger airbag assembly deactivation circuit. The base 108 of the switch 72 is electrically connected to a return line, for the passenger airbag assembly, to the airbag diagnostic module. When the switch 72 is placed in a first switch position 110 or a second switch position 112, the switch 72 is electrically connected to a return line 114 from the airbag system for the passenger airbag assembly. In these two positions, the passenger airbag assembly is active. When the switch 72 is placed in a third 116 or a fourth 118 switch position, the return line to the airbag diagnostic module is now connected, through a combined resistor-fuse 120, between a feed line 122 from the airbag system and a feed line 124 to the airbag diagnostics module. The passenger airbag assembly is now deactivated, but the resistor-fuse 120 is connected to the system to allow for current to flow during diagnostic checks on the passenger airbag system.

When the switch 72, then, is in the fourth switch positions 76,100,118, the LED's will be activated and the current will flow through the resistor-fuses 102,120 rather than through the return lines 99, 114, thus disabling both the driver and passenger airbag assemblies.

Figure 5:
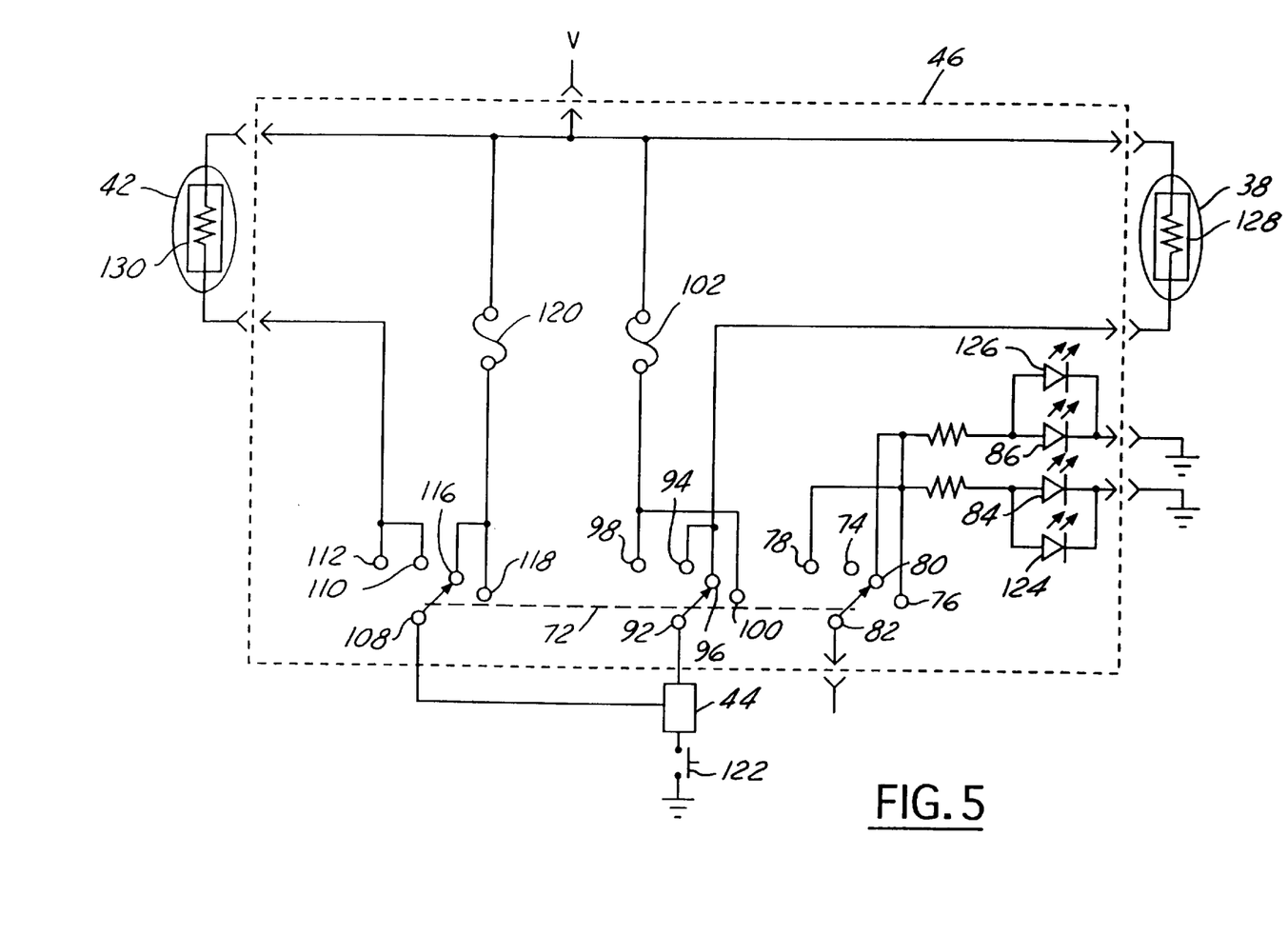
FIG. 5 is an alternative representation of the electrical schematic of the deactivation circuit of FIG. 4, showing a slightly modified configuration.

FIG. 5 is an alternative way to illustrate the switch circuit of FIG. 4, with an alternate arrangement for the LED's also shown. The circuit is contained within the housing 46. Two of the bases 92,108 of the switch 72 connect through the airbag diagnostic module 44 to an airbag actuation switch 122. The airbag actuation switch 122 will not be discussed further since it is part of the overall airbag system and does not form a part of the present invention. This circuit illustrates the LED's 84,86 discussed in relation to FIG. 4, and two additional LED's 124,126, each one in parallel with one of the others. This arrangement allows for a backup so that if one LED malfunctions, the other in parallel with it will still light, allowing the driver and front seat passenger to still note visually that a particular airbag assembly is deactivated.

This figure illustrates how the switch 72, during airbag deactivation, will divert the current from the firing mechanisms 128,130 of the airbag assemblies 38,42, respectively, through the resistor-fuses 102,120. The resistor-fuse elements 102,120 are referred to as such because in this circuit they not only act as fuses that will open at a predetermined level of current, but these fuses are designed to have a predetermined resistance. It is known to apply low power to airbag systems to test the integrity of the systems. The circuit diagnosis effected during such operation makes use of the resistance of certain of airbag electrical components, such as the firing mechanisms 128,130. With an airbag assembly deactivated however, the resistance of the particular firing mechanism 128 or 130 will no longer be connected to the circuit. In order to account for this, the fuse 102 connected through the driver side of the circuit has a resistance which matches the resistance of the firing mechanism 128, and the fuse 120 connected through the passenger side of the circuit has a resistance which matches the resistance of the firing mechanism 130. With this arrangement, the diagnostic check can still be performed, even when one or both of the airbag assemblies 38,42 is deactivated.

For the operation of the circuit illustrated in FIG. 4, the switch 72 moves the flow of electrical power from the airbag assemblies 38,42 to an alternative position in which the electrical power is supplied to one pair or both pairs of the LED indicators, and one or both of the fuses. During engine start, a low current level test load is run through the circuit, and a diagnostics check is performed. During vehicle operation, should the airbag sensing system (not shown) determine an airbag deployment event has occurred, not discussed further herein as any conventional airbag sensor system may be employed, the switch 122 is closed and a relatively high current is delivered through the circuit. The current is of course high enough to cause the firing mechanisms 128, 130 to deploy the airbags so long as the airbag switch is not set to deactivate them at the time of the event. Advantageously, the fuses 102,120, if connected by the circuit due to the switch position at the time of the event, are sized to disconnect below the level of current that the airbag system utilizes to activate the airbag assemblies 38,42. The fuses 102,120, then, act as a memory so that if an airbag firing event has occurred that effects an airbag firing situation, one or both of the fuse 102,120 will operate to open the circuit, depending upon which airbag assemblies are deactivated at the time, and it can be readily detected that the switch was in a position where the driver, passenger or both airbags were deactivated.

Figure 6A:
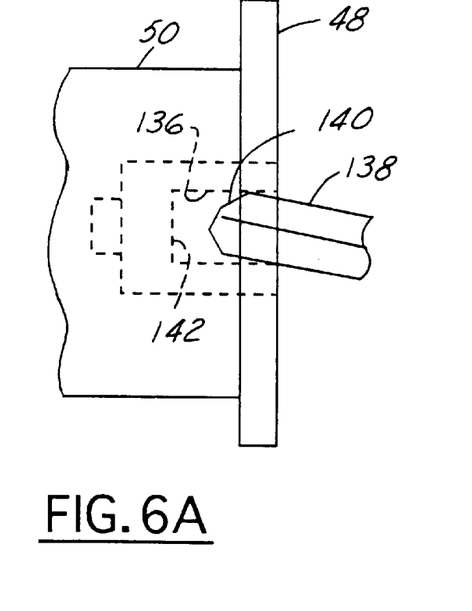
FIG. 6A is schematic side view of a portion of a key and key cylinder in accordance with the present invention.
Figure 6B:
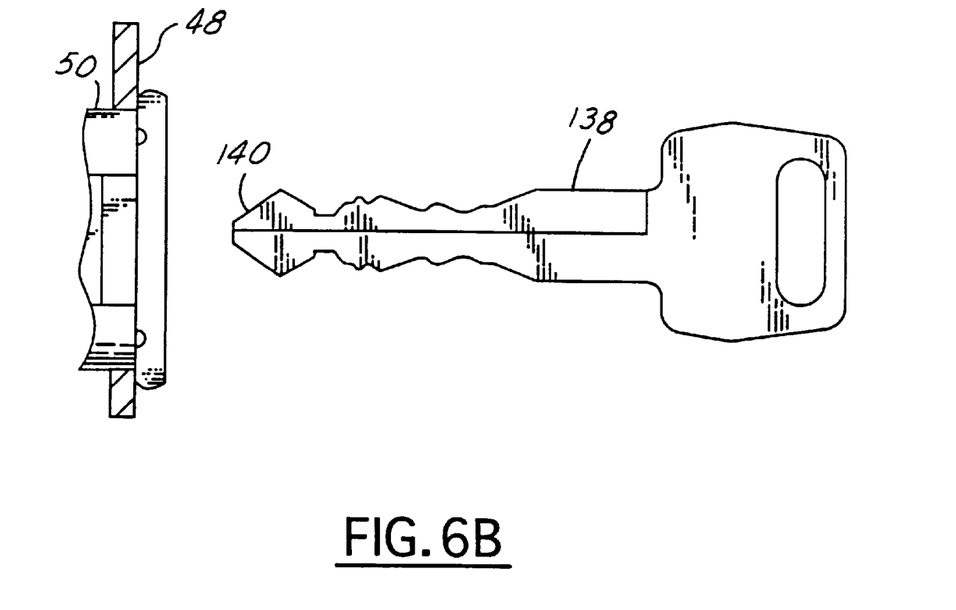
FIG. 6B is another side view of the key and a portion of the key cylinder illustrated in FIG. 6A.

FIGS. 6A and 6B illustrate the key cylinder 50 and a key slot 136, which extends into the key cylinder 50. The key cylinder 50 is mounted in the airbag deactivation module housing and is rotatable relative thereto. It also extends through the front face of the bezel 48. The key slot 136 is sized to accept a typical ignition key 138 for a motor vehicle. The key 138, upon partial insertion into the key slot 136 permits rotational movement of the key cylinder 50 between the four airbag deactivation positions. It will be noted that the key slot 136, in its longest dimension, will align with the corresponding text for the particular deactivation condition it is in (as seen in FIGS. 1–3B), giving the vehicle driver and front seat passenger an additional visual indication of the state of the airbag deactivation, in addition to the LED's. The key cylinder 50 is operatively connected in a mechanical fashion to the circuits indicated in FIGS. 4 and 5 for controlling the position of the switch 72. The purely mechanical switch arrangement for the deactivation setting will assure that the deactivation setting chosen stays in that position even when vehicle is turned off or stalls, which avoids any concern with the deactivation settings changing if a stall situation occurs during vehicle operation.

While this key arrangement is operable with any typical vehicle ignition key, as is preferred, it can be configured to operate only with a key having the shape for a particular manufacturer, if so desired. Moreover, the configuration illustrated in FIGS. 6A and 6B will allow the cylinder to be rotated by inserting any flat object with the general dimensions of the tip 140 of an vehicle ignition key. The reason for allowing this flexibility is to allow one who wishes to change the setting to be able to purposefully do so, although generally one will accomplish the change with an ignition key. However, the key cylinder 50, by requiring at least the insertion of some object into the key slot, will prevent the deactivation mode from being changed inadvertently, as could happen if one were to configure the deactivation module with merely a hand operable switch or button. Further, the requirement for insertion of a key like object will prevent children from playing with the deactivation setting and changing it to a position not desired by the vehicle operator.

Additionally, the key slot 136 includes a key stop 142, which only allows a key 138 to extend a short distance into the key slot 136 before it abuts the stop 142. The shallow distance that the key stop 142 is recessed into the key slot 136 is such that a typical ignition key 138, if released from ones hand while in the slot, will fall out. Thus, an ignition key 138 cannot be left in the slot, which would effectively convert it to a hand operated switch or button.

There are two reasons why it is desirable for the key 138 to fall out if not supported in ones hand. The first was discussed above in that it is not desirable to allow children, or others not authorized, to change the settings without the driver knowing of this. Second, depending upon the location of the key cylinder 50 on the instrument panel (some potential locations illustrated in FIGS. 1 and 2), it may not be desirable to have a key protruding from the key slot 136 in the instrument panel during vehicle operation. This may create a hard point that one may potentially impact during a sudden deceleration of the vehicle.

Figure 7:
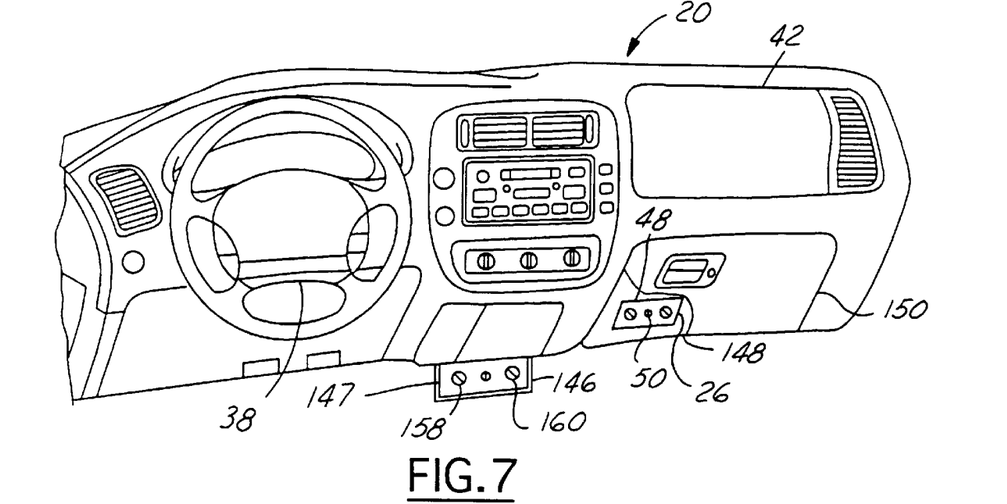
FIG. 7 is an elevation view, similar to FIG. 2, illustrating another alternate embodiment of the present invention.
Figure 8:
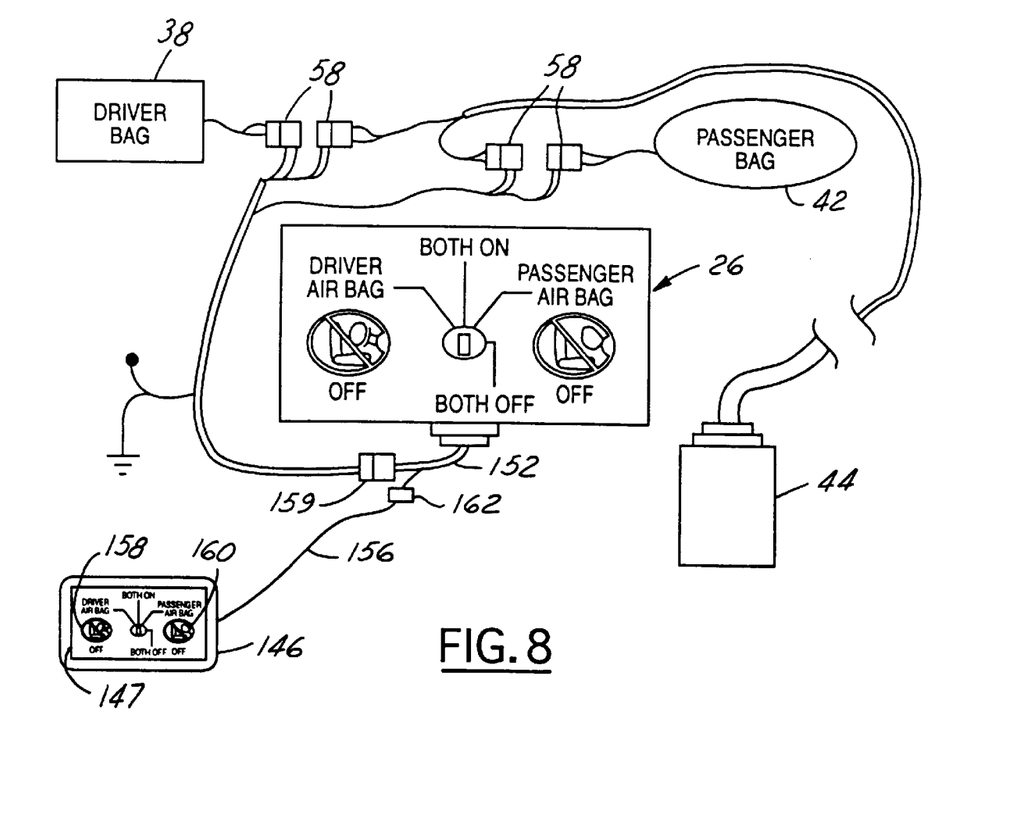
FIG. 8 is a partially schematic view, similar to FIGS. 3A and 3B, illustrating the airbag disabling system illustrated in the embodiment of FIG. 7.
Figure 10:
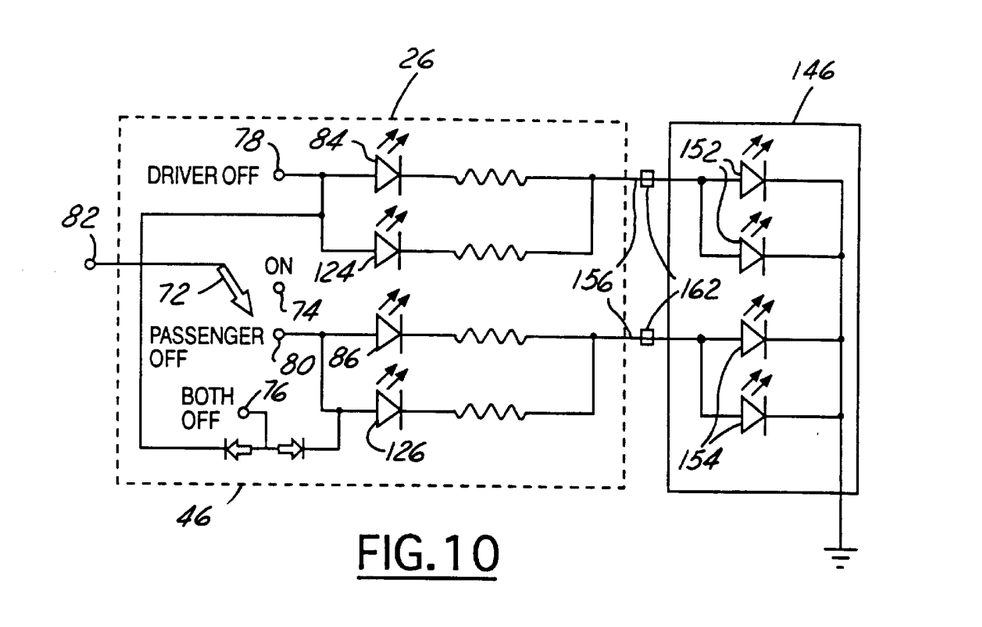
FIG. 10 is a electrical schematic diagram corresponding to the airbag disabling system illustrated in FIGS. 8 and 9.

FIGS. 7 and 8 are similar to FIGS. 2 and 3A, only illustrating an alternative embodiment. For this embodiment, an additional remote indicator assembly 146 is provided and electrically connected to the LED portion of the circuits illustrated in FIGS. 4 and 5. The changes to the LED portion of the circuit, for this embodiment, are illustrated in FIG. 10.

The remote indicator assembly 146 does not include any of the switching functions or key cylinder 50, and so is much thinner and more compact than the airbag deactivation module 26. This thinness and compactness allows for more flexibility in determining where the remote assembly 146 is mounted, to assure to the greatest extent possible that both the driver and front seat passenger can view the current state of the airbag deactivations. This allows for more flexibility in locating the airbag deactivation module 26 within the passenger compartment of a vehicle. Further, it does appear similar to the module 26 in that its has a front bezel 147 with a very similar appearance to the main bezel 48 so as to be easily recognizable by occupants from different vehicles.

In this embodiment, the module 26 is illustrated mounted within the glovebox 148 of the instrument panel 20. Consequently, while one may open the glovebox door 150 when a change in deactivation settings is desired, with the door 150 closed, neither the vehicle operator nor the front seat passenger will be able to see the airbag deactivation module 26. In order to account for this, the remote indicator assembly 146 includes LED's, a first pair of LED's 152 for the driver deactivation indication and a second pair of LED's 154 for the passenger deactivation indication, as illustrated in the schematic circuit of FIG. 10. The circuitry illustrated in this figure can be seen to generally correspond to that illustrated in the schematic circuit of FIG. 5 relative to the LED's. The first pair of LED's 152 is connected via wiring 156 to the LED's 84,124 in the main module 26, while the second pair 154 is connected via the wiring 156 to the LED's 86,126. In this way, when some or all of the LED's 84,86,124,126 in the main module 26 are activated, the corresponding pairs of LED's 152,154 will be activated in the remote assembly 146.

The first pair of LED's 152 are located behind the driver indicator 158, and the second pair of LED's 154 are located behind the passenger indicator 160. The illuminated indicator(s), then, will allow the driver and front seat passenger to easily determine the deactivation state of the airbags. Having two LED's per indicator light is meant to assure that if one LED becomes inoperable, the indicator will still be able to indicate a deactivation state of an airbag.

Also of note, the wiring 156 splits off from wiring 157, which extends through a connector 159 to the splices 58. Wiring 156 includes a splice location held together by a connector 162. This connector 162 provides for flexibility of mounting the overall assembly in different vehicles with only minimal changes in the basic hardware, as is discussed below in regard to FIG. 11.

Figure 9:
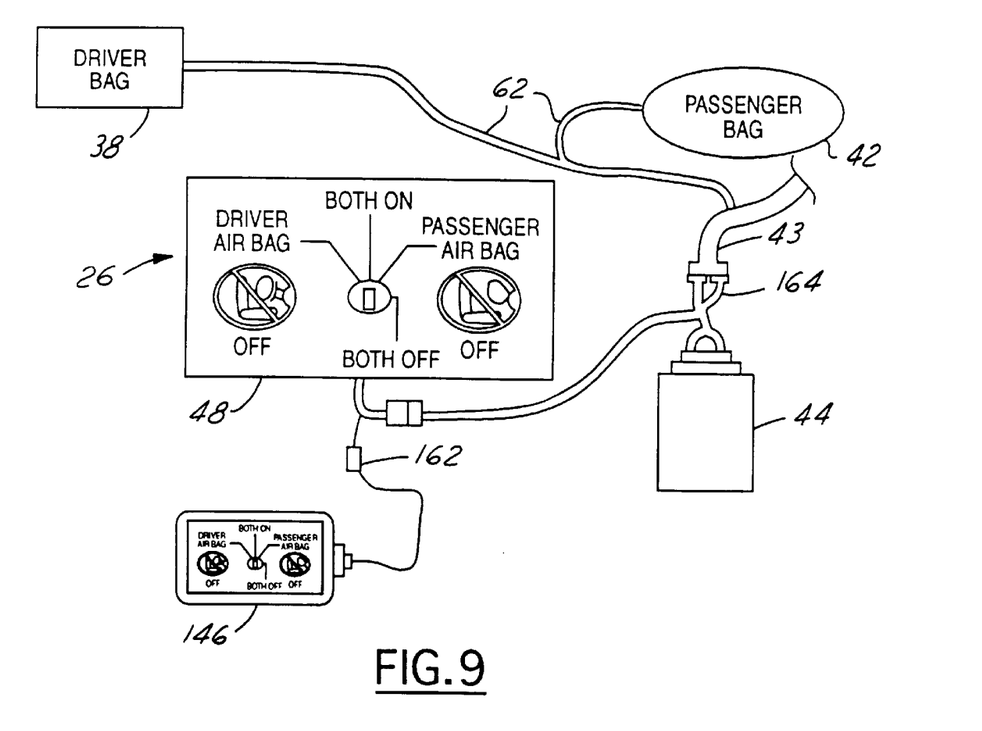
FIG. 9 is a view similar to FIG. 8, illustrating another alternate embodiment of the airbag disabling system of FIG. 7.

FIG. 9 illustrates an alternate embodiment to FIG. 8, with the differences being similar to the differences in configuration between FIGS. 3A and 3B. The remote indicator assembly 146 and tho circuitry is the same, but instead of splices 58, as in FIG. 8, an airbag system connector 164 is connected between the original wiring harness 43 and the airbag diagnostic module 44.

Figure 11:
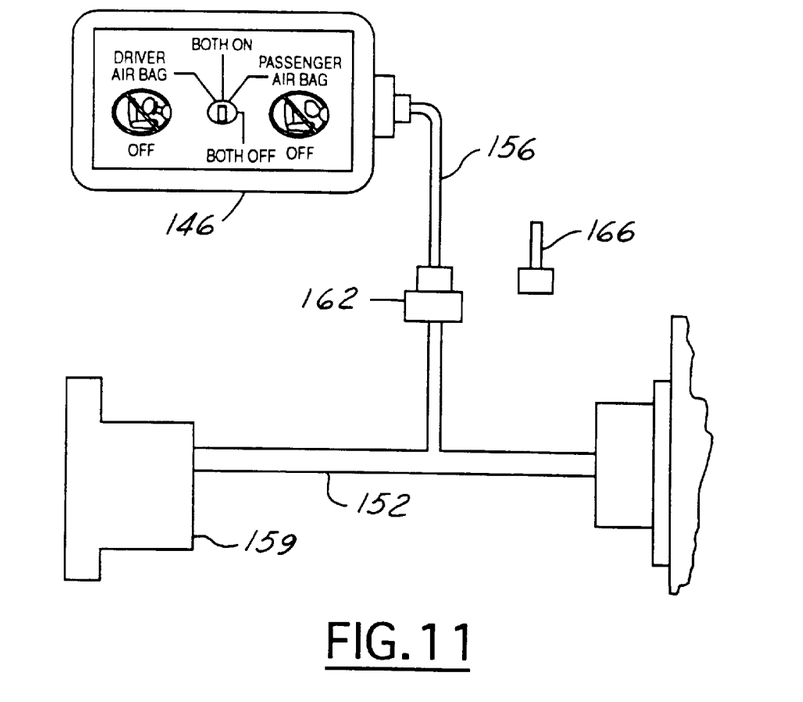
FIG. 11 is a schematic diagram illustrating an arrangement of connectors for the airbag deactivation system illustrated in FIGS. 8 and 9.

FIG. 11 illustrates the connection between the airbag module 26 and remote indicator assembly 146, as illustrated in FIGS. 8 and 9. The connector 162, which electrically connects up the indicator assembly 146 not only provides a location where different lengths of wiring 156 can be used, depending upon the locations of the remote 146 and module 26 in a particular vehicle, but also allows for the flexibility of configuring one module 26 for use with many different vehicle applications. For those vehicles which need a remote 146, wiring 156 is connected to the connector 162 during installation, while for those vehicles where no remote 146 is required, a cap 166 is provided to close off connector 162. Thus, the wiring need not change for a vehicle needing a remote and one not needing a remote. Again, this allows for the production of just one main deactivation module 26 for installation in many different vehicles.

Figure 12:
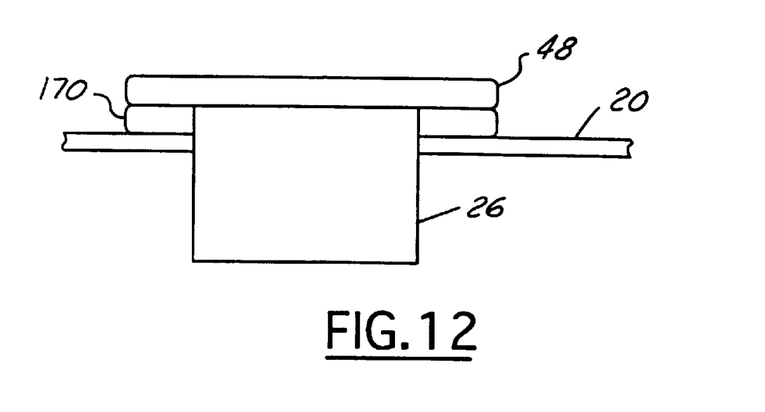
FIG. 12 is a plan view of a portion of a bezel and key cylinder in accordance with an additional embodiment of the present invention.

FIG. 12 illustrates the bezel 48 as it sits in front of the vehicle instrument panel 20. This figure illustrates again how the same basic airbag deactivation module 26 can be accommodated in many different vehicles, even with instrument panels that have different contours at the location where the deactivation module 26 is mounted. A foam gasket 170 is mounted between the instrument panel 20 and the bezel 48, which will allow the assembly to conform to different instrument panel surfaces.

FIGS. 13A–13E illustrate the key cylinder 50 employed with the previous embodiments discussed above. The key cylinder 50 inserts into an opening 174 in a switch support portion 175 of the housing 46. The opening 174 is generally of a diameter that is larger than an outer cylindrical portion 176 on the key cylinder 50, but also includes two smaller diameter portions 178, which in this particular embodiment each are about 15 degrees wide, with about 165 degrees between each one. The ends of these smaller diameter portions 178, form stops 180.

Affixed to the front of the cylinder 50 is a key face 182, which includes the key slot 136, through which a key is inserted when it is desired to change the deactivation setting. An arrow is formed in its front face to provide a visual indication to the cylinder orientation, and thus switch position.

The back wall of the key cylinder 50 forms the key stop 142, and since it is desirable to limit the extent to which a key can be inserted, as discussed above in relation to FIGS. 6A and 6B, the depth of the key cylinder 50 is much less than the length of a typical ignition key. This not only serves to accommodate the desire to prevent keys from being left in the key slot 136, but also keeps the overall depth of the airbag deactivation assembly to a minimum, thus maximizing the locations where it can be installed in various vehicles.

Figure 13A:
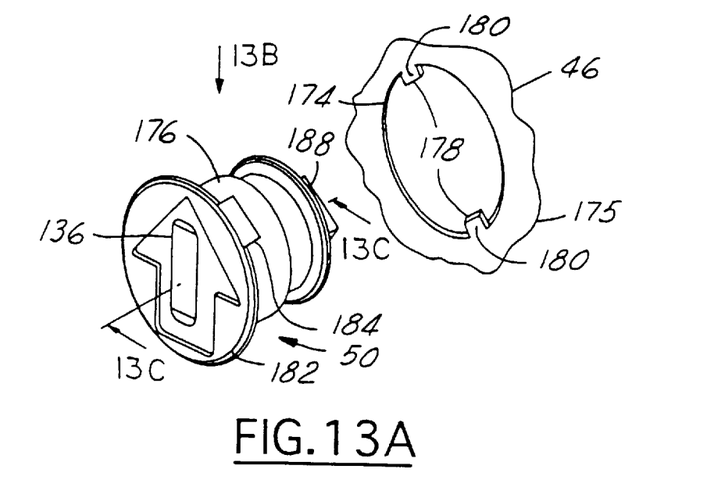
FIG. 13A is a partially exploded perspective view of a key cylinder in accordance with the present invention.
Figure 13B:
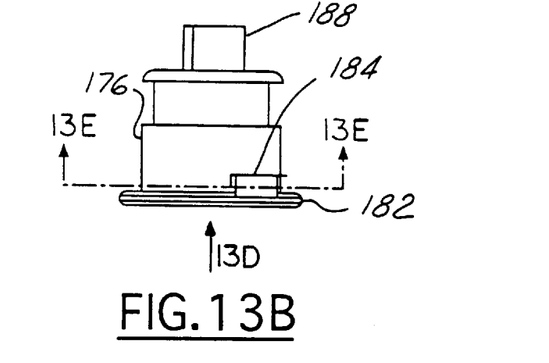
FIG. 13B is a view of the key cylinder taken in the direction of arrow 13B in FIG. 13A.
Figure 13C:
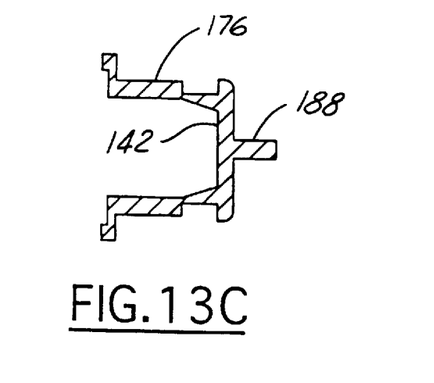
FIG. 13C is a sectional view taken along line 13C—13C in FIG. 13A.
Figure 13D:
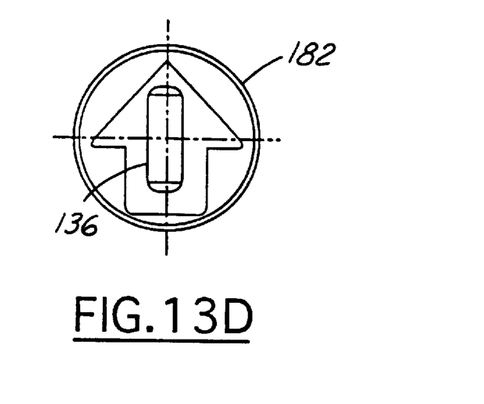
FIG. 13D is a view taken in the direction of arrow 13D in FIG. 13B.
Figure 13E:
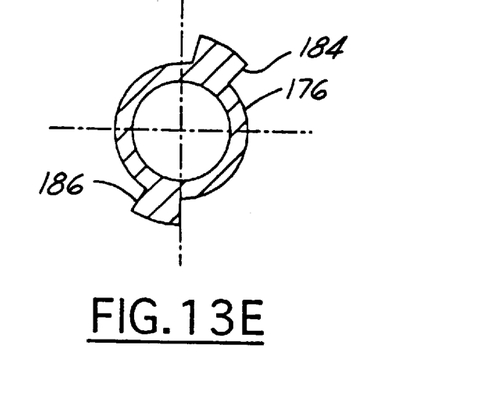
FIG. 13E is a sectional view taken along line 13E—13E in FIG. 13B.

Extending from the outer cylindrical portion 176 are first and second rotation control tabs 184, 186, respectively, with each having a width of about 30 degrees. The left edge, as seen in FIG. 13E, of the first rotational control tab 184 is about 15 degrees clockwise from a vertical axis and the right edge of the second control tab 186 is adjacent the vertical axis. The control tabs 184,186 have an outer diameter which is larger than the smaller diameter portions 178 on the switch portion 175, and so will abut the stops 180 when rotated to certain orientations. Thus, the rotational travel of the key cylinder 50 relative to the switch portion 175 is limited. The dimensions are set such that the limits of the rotation will allow for the switching between the four positions on the switch. In this case, about 45 degrees counterclockwise from the airbag-on position and about 90 degrees clockwise, as can be seen in FIGS. 3A and 3B. A switch control tab 188 interfaces with the switch 72, illustrated in FIGS. 4 and 5, to mechanically control the switch settings.

Figure 14A:
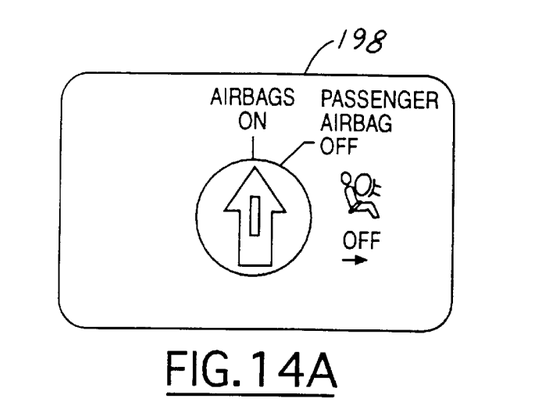
FIG. 14A is a front view of an airbag switch plate in accordance with another embodiment of the present invention.
Figure 14B:
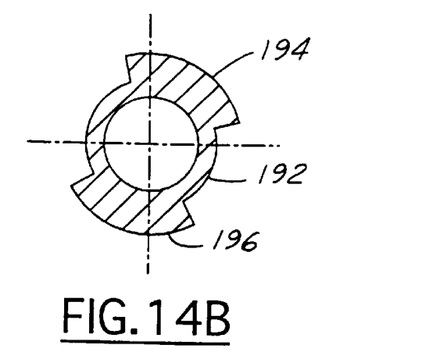
FIG. 14B is a sectional view similar to FIG. 13E illustrating the embodiment of FIG. 14A.

FIGS. 14A and 14B illustrate an alternate embodiment of the key cylinder of FIGS. 13A–13E. For this embodiment, the key cylinder 192 is generally the same as with the embodiment of FIGS. 13A–13E, except that the rotation control tabs have changed. The first rotational control tab 194 now extends from about 15 degrees to the left of the vertical axis as viewed in FIG. 14B to about 75 degrees to the right of the vertical axis. The second rotational control tab 196 now extends from about 30 degrees below the horizontal axis on its left end to about 30 degrees to the right of the vertical axis on its right end. This cylinder is otherwise the same as that in FIGS. 13A–13E and assembles into the other switch parts, which remain unchanged, except for the bezel, discussed below. The key cylinder 192, with the changed control tabs 194,196, is now configured to only allow for passenger airbag deactivation. The control tabs 194,196 will hit the stops 180 before the switch reaches the driver-airbag deactivation or both-airbag deactivation positions.

Since only passenger airbag deactivation is possible with this key cylinder 192, an alternate bezel 198 is employed to indicate such to the driver and front seat passengers. While the cylinder 192 and the bezel 198 change, all of the other components of the deactivation assembly remain the same, thus allowing for flexibility in determining what deactivations will be possible for a particular vehicle when installed, while maintaining simplicity and minimizing the overall cost for the various alternate possibilities. Thus, the electrical circuit and switching mechanisms do not change even though, for this embodiment, all four switching positions are not used.

Figure 15A:
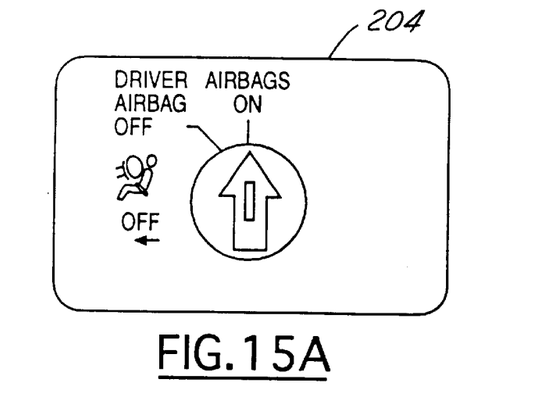
FIG. 15A is a view similar to FIG. 14A illustrating a different embodiment of the present invention.
Figure 15B:
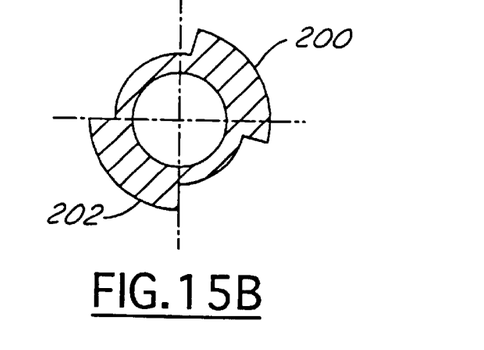
FIG. 15B is a sectional view similar to FIG. 13E, illustrating the embodiment of FIG. 15A.

FIGS. 15A and 15B illustrate another alternate embodiment of the key cylinder of FIGS. 13A–13E. For this embodiment the rotational control tabs have changed so that only the driver airbag deactivation is possible, not the passenger only or the driver and passenger deactivations. The first rotational control tab 200 now extends on its left end, as viewed in FIG. 15B, about 15 degrees to the right of a vertical axis to about 15 degrees below a horizontal axis on its right end. The second rotational control tab 202 now extends on its left end adjacent a horizontal axis, to its right end adjacent the vertical axis. A bezel 204 now indicates the only two available positions. Again, as with the embodiment of FIGS. 14A–14B, the rest of the deactivation system does not change.

Figure 16A:
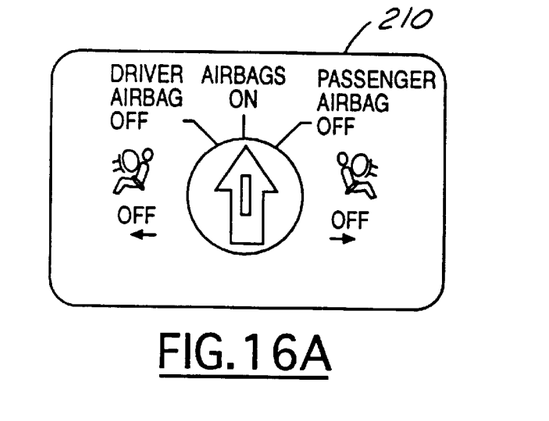
FIG. 16A is a view similar to FIG. 14A illustrating another embodiment of the present invention.
Figure 16B:
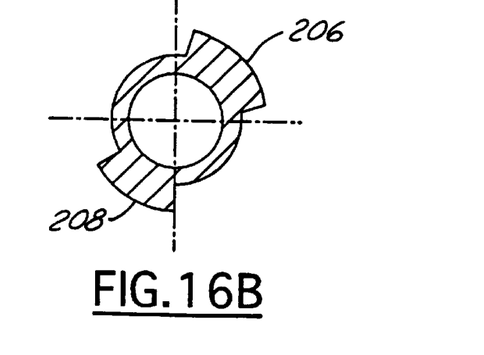
FIG. 16B is a sectional view similar to FIG. 13E illustrating the embodiment of FIG. 16A.

FIGS. 16A and 16B illustrate a further alternate embodiment of the key cylinder of FIGS. 13A–13E. For this embodiment the rotational control tabs have changed again, and now will only allow for driver or passenger airbag deactivation, but not both. The first rotational control tab 206 now extends on its left end, as viewed in FIG. 16B, from about 15 degrees to the right of a vertical axis to about 15 degrees from a horizontal axis on its left end. The second rotational control tab 208 now extends on its left end from about 30 degrees below the horizontal axis to about adjacent with the vertical axis on its right end. A bezel 210 now indicates the only three available positions.

Consequently, by ordering the switch positions and designing the key cylinder to allow for the interchangeability of the cylinders and bezels, as illustrated in FIGS.

13A–16B, one can limit the airbag deactivation combinations, during the installation of the system, to those required, depending upon customer and regulatory needs. At the same time, the rest of the deactivation assembly, other than the key cylinders and bezels, may remain the same.

While certain embodiments of the present invention have been described in detail, those familiar with the art to which this invention relates will recognize various alternative designs and embodiments for practicing the invention as defined by the following claims.

We claim:

1. An airbag restraint system for use in a vehicle comprising:

a first airbag assembly adapted to be mounted within the vehicle;

a second airbag assembly adapted to be mounted within the vehicle;

an airbag control circuit, operatively engaging the first and the second airbag assemblies, including a wiring harness, a diagnostics module having a connector adapted for receiving the wiring harness, and a deactivation module having a connector interchangeable with the connector for the diagnostic module connected to the wiring harness and wiring extending to the diagnostic module connector;

an airbag deactivation circuit, operatively engaging the deactivation module, including a single switch having multiple positions for selectively deactivating the first airbag assembly, the second airbag assembly, and both airbag assemblies; and a remote indicator assembly, spaced from and operatively engaging the airbag deactivation circuit, having indication means for indicating the switch positions where one or more airbag assemblies are deactivated.

2. The airbag restraint system of claim 1 wherein the indication means includes a first and a second LED, the first LED operatively engaging the airbag deactivation circuit to indicate a deactivation condition for the first airbag assembly and the second LED operatively engaging the deactivation circuit to indicate a deactivation condition for the second airbag assembly.

3. The airbag restraint system of claim 2 wherein the indication means further includes a third LED electrically connected in parallel with the first LED and a fourth LED electrically connected in parallel with the second LED.

4. An airbag restraint system for use in a vehicle comprising:

a first airbag assembly adapted to be mounted within the vehicle;

a second airbag assembly adapted to be mounted within the vehicle;

an airbag control circuit operatively engaging the first and the second airbag assemblies;

an airbag deactivation circuit, operatively engaging the airbag control circuit, including a switch having multiple positions whereby one or more airbag assemblies can be selectively deactivated; and a remote indicator assembly, spaced from and operatively engaging the airbag deactivation circuit, having means for indicating the switch positions where one or more airbag assemblies are deactivated.

5. The airbag restraint system of claim 4 wherein the means for indicating includes a first LED.

6. The airbag restraint system of claim 5 wherein the remote indicator assembly further includes a second LED, the first LED operatively engaging the airbag deactivation circuit to indicate a deactivation condition for the first airbag assembly and the second LED operatively engaging the deactivation circuit to indicate a deactivation condition for the second airbag assembly.

7. The airbag restraint system of claim 6 wherein the remote indicator assembly further includes a third LED electrically connected in parallel with the first LED and a fourth LED electrically connected in parallel with the second LED.

8. The airbag restraint system of claim 7 wherein the airbag control circuit includes a wiring harness, a diagnostics module having connector adapted for receiving the wiring harness, and a deactivation module having a connector interchangeable with the connector for the diagnostic module connected to the wiring harness and wiring extending to the diagnostic module connector.

9. The airbag restraint system of claim 4 wherein the airbag control circuit includes a wiring harness, a diagnostics module having connector adapted for receiving the wiring harness, and a deactivation module having a connector interchangeable with the connector for the diagnostic module connected to the wiring harness and wiring extending to the diagnostic module connector.

10. A vehicle instrument panel for use in an automotive vehicle comprising:

an instrument panel main portion, including a glovebox;

a steering wheel extending from the instrument panel;

a first airbag assembly mounted juxtaposed the glovebox;

a second airbag assembly mounted in the steering wheel;

an airbag control circuit operatively engaging the first and the second airbags;

an airbag deactivation circuit mounted within the glovebox, operatively engaging the airbag control circuit and including a switch having multiple positions whereby one or more of the airbag assemblies can be selectively deactivated; and remote indicator assembly, spaced from and operatively engaging the airbag deactivation circuit, having means for indicating the switch positions where one or more airbag assemblies are deactivated.

11. The vehicle instrument panel of claim 10 wherein the means for indicating includes a first and a second LED, the first LED operatively engaging the airbag deactivation circuit to indicate a deactivation condition for the first airbag assembly and the second LED operatively engaging the deactivation circuit to indicate a deactivation condition for the second airbag assembly.

* * * * *